2 Sheets—Sheet 1.
P. DEXTER,
Assignor to C. S. & S. Burt.
MACHINE FOR PRESSING AND BUNCHING SHINGLES.
No. 7,723. Reissued June 5, 1877.
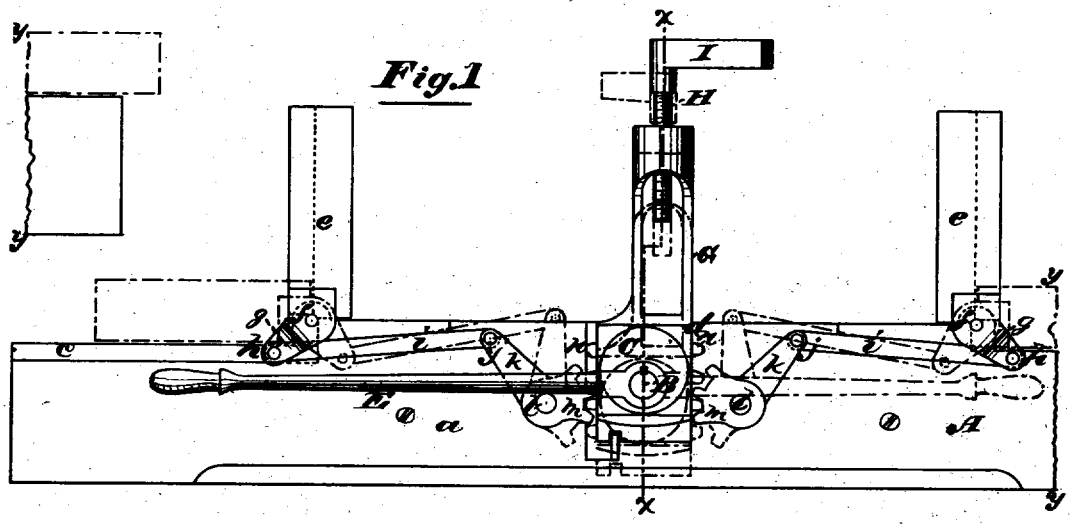
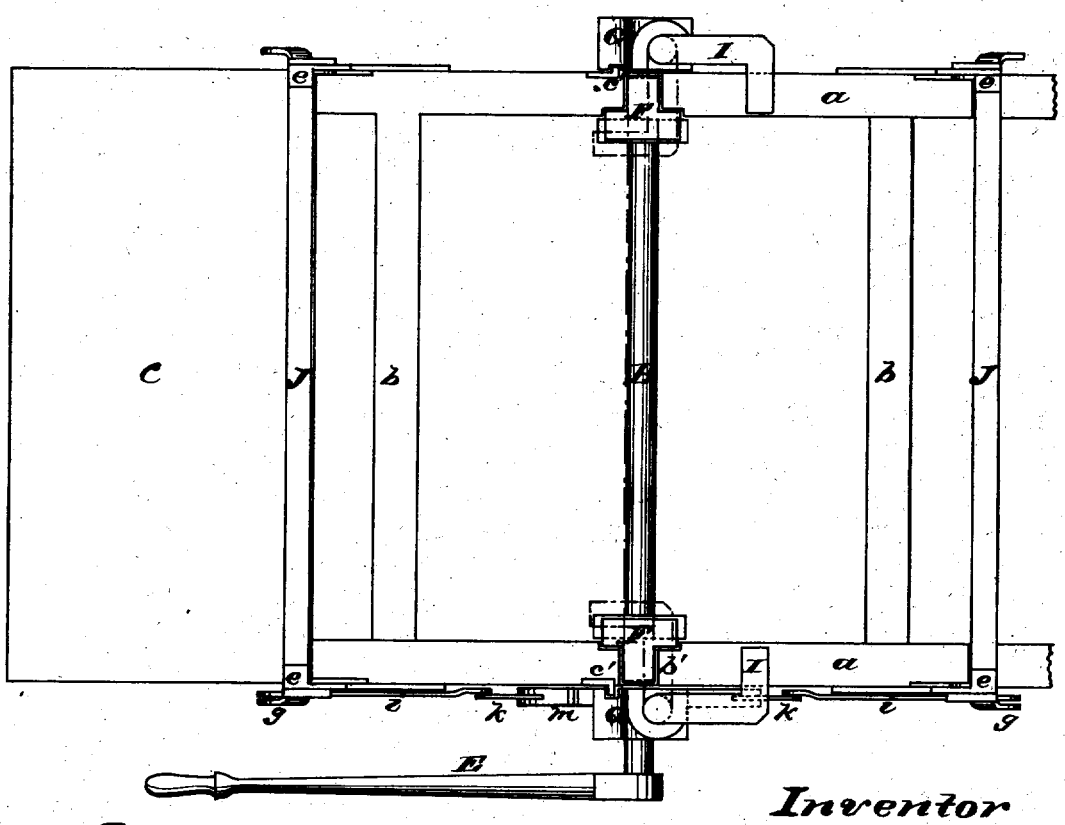
Attest
W. S. Baker
E. S. Lloyd
Inventor
Parker Dexter
By Coburn & Thacher
Attorneys
N. PETERS, PHOTO-LITHOGRAPHER, WASHINGTON, D. C.

2 Sheets—Sheet 2.

P. DEXTER,

Assignor to C. S. & S. Burt.

MACHINE FOR PRESSING AND BUNCHING SHINGLES.

No. 7,723. Reissued June 5, 1877.

Attest
W. S. Baker
E. S. Lloyd.

Inventor
Parker Dexter
By Osborn & Flagler
Attorneys

N. PETERS, PHOTO-LITHOGRAPHER, WASHINGTON, D. C.

UNITED STATES PATENT OFFICE.

PARKER DEXTER, OF CLINTON, IOWA, ASSIGNOR TO CHARLES S. BURT AND SILAS BURT.

IMPROVEMENT IN MACHINES FOR PRESSING AND BUNCHING SHINGLES.

Specification forming part of Letters Patent No. 38,036, dated March 31, 1863; eissue No. 7,723, dated June 5, 1877; application filed August 22, 1876.

DIVISION A.

*To all whom it may concern:*

Be it known that I, PARKER DEXTER, of Clinton, in the county of Clinton and State of Iowa, have invented a new and useful Improvement in Machines for Bunching and Pressing Shingles, which is fully set forth in the following specification, reference being had to the accompanying drawings, in which—

Figure 3:
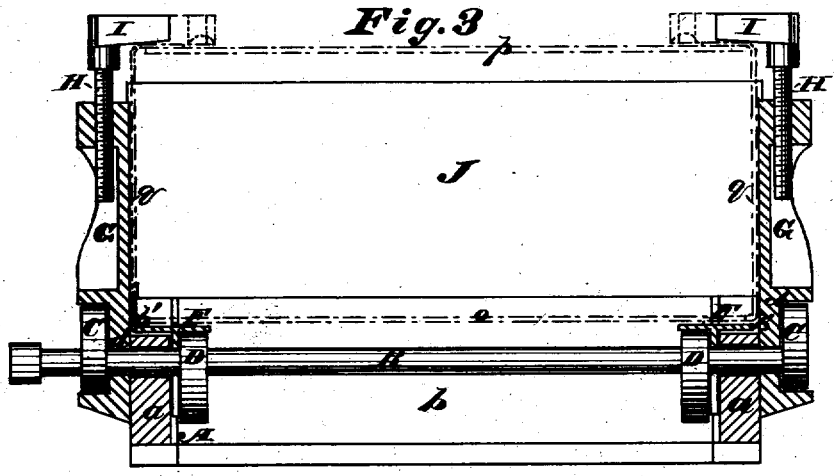
Figure 4:
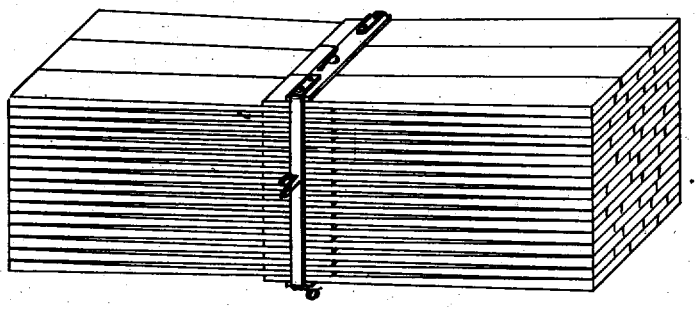

Figure 1 is a side elevation of a machine containing my improvements; Fig. 2, a plan or top view of the same; Fig. 3, a transverse vertical section of the same, taken on the line *x x*, Fig. 1. Fig. 4 is a perspective view of a bunch of shingles compressed and the band applied and fastened.

The object of my invention is to obtain a machine of simple and economical construction, by which a suitable number of shingles may be compressed compactly together, and bunched or bound together so as to form a bundle.

The invention consists in the employment of mechanism by means of which pressure is applied to the top of the bunch of shingles for the purpose of compressing the bunch; also, in the employment of mechanism by means of which pressure is applied to the lower side of the bunch for the same purpose; also, in a combination of devices by means of which the bunch of shingles is simultaneously compressed, both from above and from below, by the operation of a single lever; and, also, in various devices and combinations of devices, as will be hereinafter more fully set forth In the drawings, A represents a horizontal frame, which is constructed of two parallel bars, *a a*, connected by cross-ties *b b*. On one end of this frame there is secured a board, *c*, which is designed to serve as a seat for the operator. B is a shaft, which is fitted transversely in the frame A, and has four eccentrics, C C D D, upon it. The eccentrics C C are at the outer sides of the bars *a a* of the frame A, and the eccentrics D D at the inner sides of the same, the eccentrics C being in a reverse position on the shaft B to the eccentrics D, as shown in Fig. 3. On one end of this shaft B there is placed a lever, E.

In each bar *a*, directly over the shaft B, there is made a vertical slot or opening, *b'*, in which loose or sliding plates F are fitted, said plates projecting over the eccentrics D D, as shown clearly in Fig. 3. G G are vertical bars or yokes, the lower parts of which are fitted in vertical guides *c' c'* at the outer sides of the bars *a a*, and are allowed to slide freely up and down on them. The lower parts of these bars or yokes are each provided with a recess, *d*, at their outer sides, said recesses having their upper and lower edges parallel with each other. The eccentrics C C work within the recesses *d d* of the bars or yokes G G, as shown clearly in Fig. 3.

In the upper parts of the bars or yokes G G there are fitted screws H H, one in each, and on the upper ends of said screws there are horizontal, bent or right-angular, bars I I, one on each. The bars I I, it will be seen, may be raised or lowered by turning the screws H H.

J J represent two end boards or plates, which extend the whole width of the frame A. These end boards have vertical metal angle-plates *e* attached to their ends, and the lower ends of said plates *e* are attached by joints or hinges *f* to upright plates *g*, which are secured to the sides of the frame A. The lower ends of the plates *e*, at one side of the end boards and below the joints or hinges *f*, are connected by joints or pivots *h* to arms *i i*, the inner ends of which are connected by pivots *j j* to levers *k k*, which are secured by fulcrum-pins *l l* to the side of the frame A, and have toothed segments *m m* at their inner ends, said segments gearing into vertical racks *n* at the sides of the lower parts of the vertical bars and yokes G G, as shown in Fig. 1 of the drawings.

The band which I use in connection with the machine to secure the compressed bunch of shingles is composed of a lower cross-bar, *o*, and a corresponding upper cross-bar, *p*, which may be made of wood. These cross-bars are united at their ends by metallic side pieces *q*, the ends of which are bent and provided with holes, as shown in Fig. 4 of the drawings, and are nailed or otherwise secured to the ends of the cross-bars *o* and *p*. These side pieces *q* may be made of hoop-iron or any other suitable material.

The operation of my invention is as follows: The lever E is, in the first place, so turned or adjusted as to bring the end boards J J in a vertical position, as shown in dotted lines in Fig. 1 of the drawings, and the lower cross-bar *o* of the band is placed on the plates F in the slots or openings *b'*. The shingles are then laid on the frame A between the end boards J J, the butts being outward and resting on the cross-ties *b b*, and the points or inner ends overlapping each other, and supported by the cross-bar *o*. The end boards J J form guides to admit of the shingles being laid in proper position, and when a sufficient number of shingles have been laid on the frame A to form a bundle, the operator raises the lever E, and thereby turns outward the end boards J J to a horizontal position, as indicated by dotted lines in Fig. 1. Simultaneously with this outward movement of the end boards J J, which is produced by the racks *n* of the yokes G, the segment-levers *k*, and arms *i*, the eccentrics C C D D, respectively, draw down the yokes G and bars I and elevate the plates F, the latter pressing upward the lower cross-bar *o* of the band, and the bars I pressing down upon the upper bar *p* of the same.

By this means the shingles are compressed and compacted snugly together, and when this is accomplished the operator nails the upper ends of the sides *q* of the band to the ends of the upper bar *p*, the lower ends of the sides *q* having been previously nailed to the ends of the lower bar *o*.

At the commencement of the operation the bars I are turned outward, so that they will not interfere with the placing of the shingles on the frame; but when the bunch is formed and ready for the operation of the compressing-machine, the bars I are turned inward, so that their ends will rest upon the bar *p*, and pressed down upon it when the bars G are drawn downward.

Having thus described my invention, what I claim as new, and desire to secure by Letters Patent, is—

1. In a shingle-bunching machine, the vertically-adjustable bars G, or equivalents, provided at their upper ends with hooks or arms projecting over the upper side of the bunch, in combination with mechanism whereby the bars and hooks may be drawn down to compress the bunch from above, substantially as described.

2. In a shingle-bunching machine, the vertically-sliding plates F, or equivalents, extending underneath the bunch, in combination with mechanism whereby the plates may be forced upward to compress the bunch from below, substantially as described.

3. The combination of the adjustable bars G, provided with hooks or arms at their upper ends, sliding plates F, and mechanism, substantially as described, whereby, by the movement of a single lever, the bars and plates may be adjusted vertically, so as to compress the bunch of shingles simultaneously both at the top and bottom, substantially as set forth.

4. The combination of the sliding bars G, having hooks or arms I at their upper ends, shaft B, and eccentric cams C, substantially as and for the purpose set forth.

5. The combination of the shaft B, cams D, and sliding plates F, substantially as and for the purpose set forth.

6. The combination of the shaft B, eccentric cams C and D, lever E, sliding plates F, and sliding bars G, having projecting arms at their upper ends, substantially as and for the purpose set forth.

7. The combination of the sliding bars G and swinging adjustable arms I, substantially as described.

8. The combination of the sliding bars G and pivoted swinging end boards J, constructed and operating substantially as set forth.

PARKER DEXTER.

Witnesses:
CHAS. A. SMITH,
J. H. FLINT.